United States Patent [19]

Breeden

[11] Patent Number: 4,696,052

[45] Date of Patent: Sep. 22, 1987

[54] SIMULCAST TRANSMITTER APPARATUS HAVING AUTOMATIC SYNCHRONIZATION CAPABILITY

[75] Inventor: Robert L. Breeden, Boynton Beach, Fla.

[73] Assignee: Motorola Inc., Schaumburg, Ill.

[21] Appl. No.: 815,432

[22] Filed: Dec. 31, 1985

[51] Int. Cl.[4] .......................... H04B 1/00; H04B 7/00

[52] U.S. Cl. .......................................... 455/51; 455/54; 455/56

[58] Field of Search ........................ 455/18, 33, 51, 53, 455/54, 56, 57; 375/107; 370/108

[56] References Cited

U.S. PATENT DOCUMENTS

| | | | |
|---|---|---|---|
| 3,752,921 | 8/1973 | Audretsch, Jr. et al. . | |
| 3,906,159 | 9/1975 | Lutz . | |
| 3,962,634 | 6/1976 | Russo . | |
| 4,114,411 | 9/1978 | Travis . | |
| 4,188,582 | 2/1980 | Cannalte et al. . | |
| 4,218,654 | 8/1980 | Ogawa et al. . | |
| 4,234,958 | 11/1980 | Pipes et al. . | |
| 4,255,814 | 3/1981 | Osborn . | |
| 4,506,384 | 3/1985 | Lucas | 455/51 |

*Primary Examiner*—Jin F. Ng

*Attorney, Agent, or Firm*—Edward M. Roney; Donald B. Southard

[57] ABSTRACT

A simulcast transmitter apparatus having automatic synchronization capability is disclosed which utilizes a signal readily available from any one of a number of available master timing sources to maintain a constant, uniform time delay to the transmitter via its interconnect link, even though the time delay corresponding to this interconnect link is susceptible to variation. Each interconnect link may consist of a phone line or other radio link which exhibits a relatively fixed, but unstable, delay. Each base station includes at least a transmitter and an adaptive-delay device which operates as a remotely-adjustable delay network upon receipt of a resync signal from a central controller to readjust and automatically maintain a uniform amount of time delay to each transmitter in the base stations. A master timing signal receiver, such as a suitable radio navigation receiver, is coupled to a suitable fixed delay network and provides the reference sync signal for each remotely-sited base station throughout the designated geographical area. This transmitter is therefore able to be compensated for varying amounts of delay caused by utilizing alternate links which may be necessary to maintain system reliability while overcoming inclement weather, interference, or other equipment difficulties.

11 Claims, 10 Drawing Figures

SIMULCAST TRANSMITTER APPARATUS HAVING AUTOMATIC SYNCHRONIZATION CAPABILITY

BACKGROUND OF THE INVENTION

This invention pertains to the radio communication art and, more particularly, to apparatus which automatically maintains a uniform delay for simultaneous broadcast of information or message signals by a plurality of transmitters.

Simultaneous broadcast, or simulcast, systems are well known in the radio transmission art. In such systems, a plurality of remotely sited transmitters simultaneously broadcast identical audio, or data message signals at a particular carrier frequency. By having one transmitter for each zone, which is a part of a geographical area, maximum signal coverage for the given geographical area is provided. A problem with such systems occurs, however, when a portable radio happens to be positioned between two transmitting sites such that it receives a nearly equal strength carrier signal from each. In this situation, it is important that the message signal from the two transmitters be synchronized in time, otherwise message signal intelligibility may be lost.

Known prior art systems generally have dealt with the problem of different time delays ($t_1$, $T_2$, . . . $t_N$) by utilizing fixed time delays at the central controller to provide a uniform delay to each base station. These fixed delays are preset at the time of equipment installation and alignment, adding a long, fixed time delay to short-delay interconnect links and adding a short, fixed time delay to long-delay interconnect links. Once set, however, the fixed delays remain constant even though the interconnect links' related RF or phone-line equipment may in fact change due to aging or outright substitution. As a result, a technician capable of re-aligning the equipment must be dispatched to diagnose and re-adjust the appropriate fixed delay to bring the disturbed interconnect link back into time synchronization. Such a maintenance process is expensive, time-consuming, and disruptive to the simulcast system.

One known prior art system has compensated for this problem by establishing the following arrangement. An audio signal to be simulcast is sent from a central controller to various remotely-sited transmitters. The central controller, upon establishing interconnect links between itself and each of the simulcast transmitter sites, merely recalls the appropriate, predetermined time delay value stored in memory to provide the delay needed for signals carried over a given interconnect link. However, such an approach is ineffective for compensating varying amounts of delay caused by more than one possible interconnect link between the central controller and a particular remotely-sited transmitter. Quite often, alternate links may be necessary because of inclement weather, interference, or other equipment difficulties. Such problems exist whether the interconnection link is an RF link or a phone-line link. Moreover, because such systems rely on predetermined, stored values of time delay in a memory bank located at the central controller, these systems operate in an open-loop fashion, unable to fully compensate for the amount of audio delay encountered in a new, alternate interconnect link. Such an approach, therefore, does not totally eliminate costly periodic maintenance.

Accordingly, there exists a need for an improved automatic synchronization apparatus for a simulcast transmitter which is capable of being remotely adjusted such that the total delay to each base site transmitter, via its respective interconnect link, is effectively compensated in closed-loop fashion to automatically provide a uniform, time-synchronized signal.

SUMMARY OF THE INVENTION

It is an object of the present invention to provide an improved, automatic synchronization apparatus for a simulcast transmitter which is part of a simulcast transmission system for providing precise time-synchronized message signals throughout a designated geographical area.

It is a further object of the present invention to provide an improved, automatic synchronization apparatus for a simulcast transmitter which is part of a simulcast transmission system having uniform time synchronization of message signals and utilizing an external master timing signal providing a reference sync signal for setting an adjustable delay located in each base station in closed-loop fashion upon command from a system central controller. This automatic synchronization apparatus should effect a uniform delay for message signals while minimizing expense, time, and disruption to the simulcast transmitter apparatus within the base station.

Briefly described; the present invention is embodied in a simulcast transmission system having a central controller for controlling, via an interconnect link, the operation of each transmitter located at a plurality of base station sites. This simulcast transmission system also includes an improvement for automatically time-synchronizing the message signals broadcast by the remote transmitters, whether these signals are data or voice signals. Periodically, the central controller outputs a resynchronization command via the interconnect link to the base stations. Each base station, for example, may be coupled to the central controller by means of an interconnect link such as a phone line having a suitable modem (or modulator-demodulator) which together exhibit a relatively fixed, but unstable, delay. Each base station also includes at least a transmitter having a transmit antenna and an adaptive-delay device. The adaptive-delay device consists of an adjustable delay and an intelligent sync comparator. This adaptive-delay device with memory operates as a remotely-adjustable delay network upon receipt of a resync signal from the central controller and utilizes a reference sync signal derived from an included master timing signal receiver to provide a uniform amount of time delay for each transmitter remotely-sited throughout the designated geographical area. The master timing signal receiver may be a suitable radio navigation receiver coupled to a suitable fixed delay network for providing the reference sync signal.

Additional features, objects, and advantages of the automatic synchronization apparatus for a simulcast transmitter according to the present invention will be more clearly comprehended by the following detailed description together with the accompanying drawings.

DETAILED DESCRIPTION OF THE PREFERRED EMBODIMENT

Figure 1:
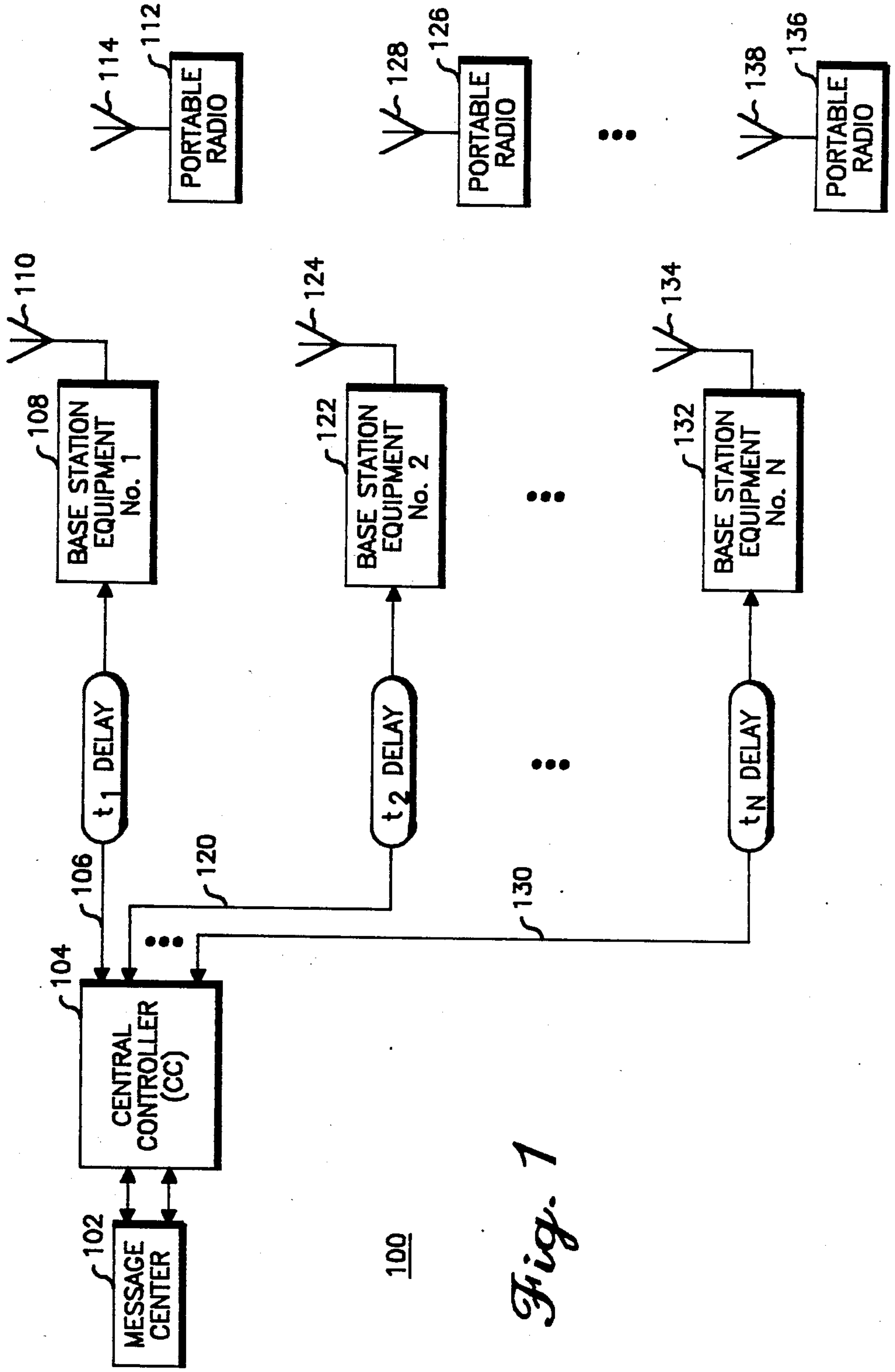
FIG. 1 is a functional block diagram of a simulcast transmission system that may advantageously utilize the present invention.

Referring to FIG. 1 , there is illustrated a general communication system 100 having a simulcast transmission mode that communicates message signals from a message center 102, via a communications medium such as a radio frequency (RF) communications channel, to one or more portable radios 112, 126, and 136. Although described as a general communication system, message signals having either data signals or analog signals, such as voice signals, may be communicated over the RF communications channel to the portable radios 112, 126, and 136. The simulcast transmission system covers a large geographical area which is divided into a plurality of zones. A central controller (C.C.) 104, coupled to the message center 102, orchestrates the precise signal routing of the message signals to equipment located in each of the zones. The central controller 104 perhaps could serve as few as two zones, but is more likely to serve a large number of zones over a wide geographic area. By design, central controller 104 is linked to each of the zones via an interconnect such as link 106, for example, going to base station equipment 108 dedicated to zone 1. This interconnect link may be an RF link having a dedicated transmitter-receiver pair (not shown), or a phone-line link having a suitable modulator-demodulator (or modem) pair, also not shown. Interconnect links such as 106 exhibit a fixed, but unstable or changeable, delay, here designated as $t_1$. Typical values of delay for interconnect links such as 106 may range from near zero to 250 microseconds, depending on the distance involved. Base station equipment 108 has an antenna 110 electrically connected to it for coupling to the communication channel and, ultimately, one or more portable radios. Similarly, a second interconnect link 120 having a corresponding delay $t_2$, proceeds to base station equipment 122 located in zone 2, which has an antenna 124 for coupling to the RF communications channel. Further interconnect links and base station equipment covering each zone are provided, even though not depicted at 100 in FIG. 1, except for the designated last zone having interconnect link 130 with corresponding delay $t_N$, going to base station equipment 132 located in the last zone having the highest number, designated N, with a similarly dedicated antenna 134.

The RF communications channel in a simulcast transmission system is preferably comprised of a single carrier frequency which may be modulated with the message signal. The base station equipment 108, 122, and 132 include transmitters which are operative on the designated carrier frequency to provide coverage for each zone of the geographical area by an assigned one of the transmitters.

Portable radios 112, 126, and 136 may be either commercially available portable transceivers or commercially available mobile transceivers. Portable radios 112, 126, and 136 each include at least a receiver operable on the carrier frequency. The receiver utilized in portable radios 112, 126, and 136 must be able to demodulate the message signal. Typical radio equipment as referred to herein is described in Motorola instruction manuals available from the Service Publication Department of Motorola Inc., 1301 E. Algonquin Road, Schaumburg, Illinois or from Motorola C & E Parts, 1313 E. Algonquin Road, Schaumburg, Illinois.

The message center 102 of the simulcast transmission system in FIG. 1 may either be remotely located from the central controller 104 or located near it. Thus, message center 102 may be coupled to the central controller 104 by means of commercially available modems and associated dedicated phone lines, or else by direct electrical connection when located in near proximity.

The central controller 104 in FIG. 1 may have more than one mode of operation encompassing a normal simulcast mode as well as other modes and may serve not only to transmit message signals to, but may receive message signals from, portable radios 112, 126, and 136. However, in describing the present invention, its primary purpose is to provide a common control point for coordinating the simultaneous broadcast or simulcast transmission of a message signal by every transmitter in each base station in time synchronization. The message signals may include coded data packets which may contain a binary preamble, as well as an information word containing a command, status, or data. The format of the data packets may be any of a number existing data formats, and there is no requirement that the data contain a repetitive pattern.

Figure 2:
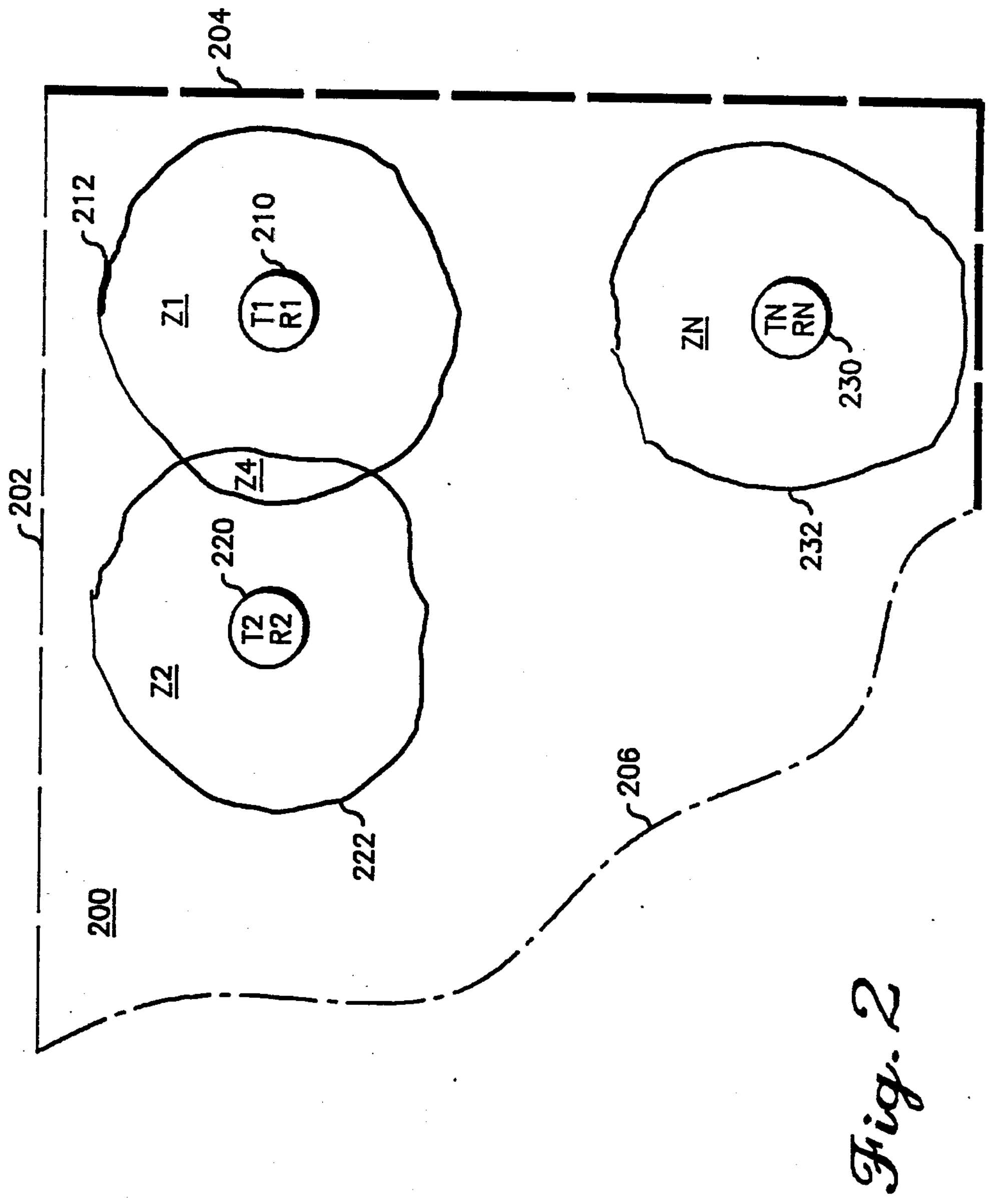
FIG. 2 is a diagram of a geographical area that is divided up into a number of zones.

Referring to FIG. 2, there is illustrated a partial geographical area 200 as it might be divided into zones such as Z1, Z2, ZN, having a typical region of overlapping coverage as denoted by zone Z4. Other zones may exist within the boundaries 202, 204, and 206, but are not shown. Each of the three zones Z1, Z2, ZN, shown includes base station equipment and the corresponding transmitting (and possible receiving) antennas making up the zone equipment 210, 220, and 230. Transmitter T1 of zone equipment 210 has a coverage area within circle 212, transmitter T2 of zone equipment 220 within circle 222, and so on all the way up to transmitter TN of zone equipment 230 within circle 232.

Figure 3:
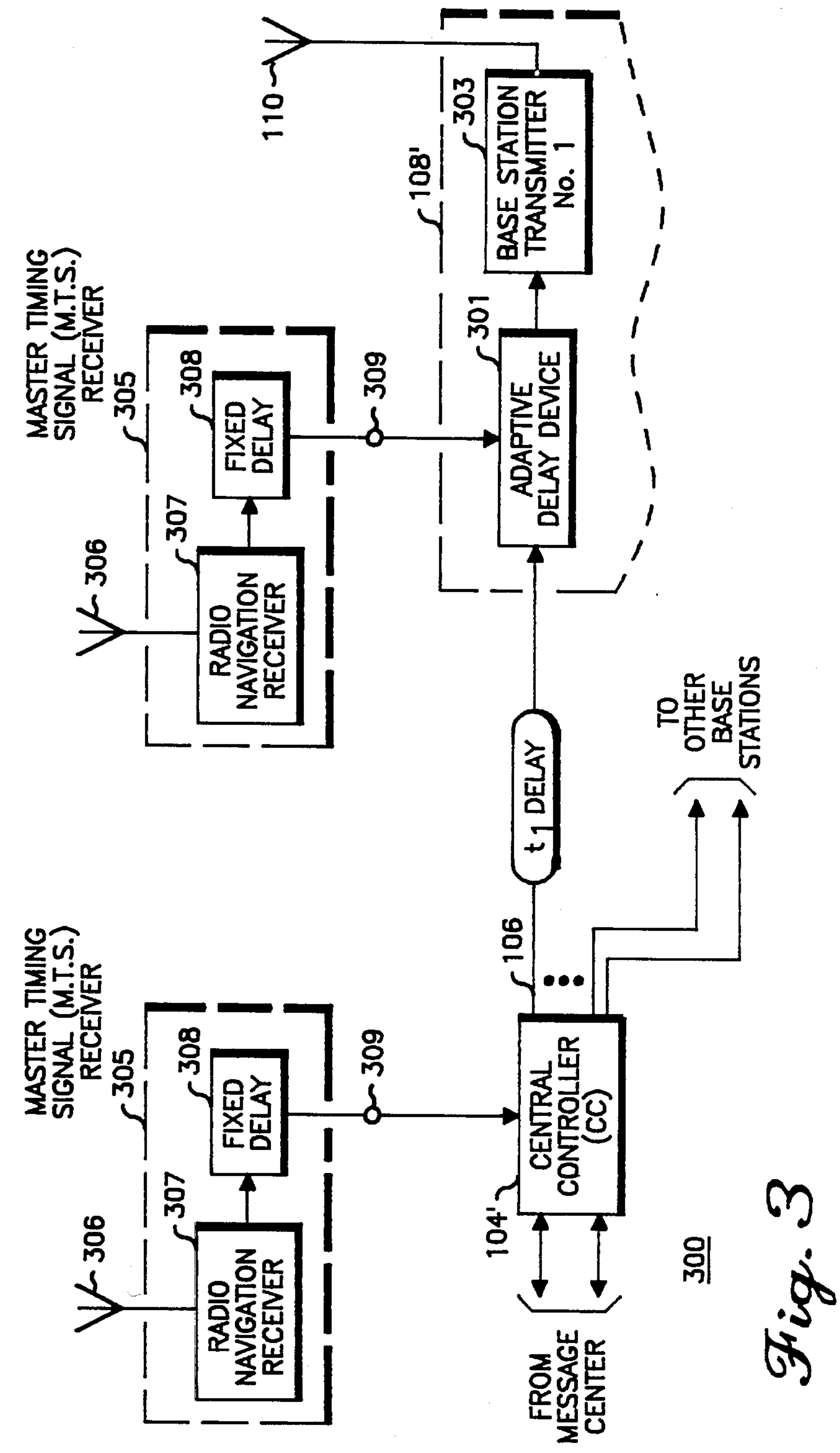
FIG. 3 is a block diagram of the functional blocks included in a given central controller-base station branch necessary to implement the present invention.

Turning now to FIG. 3, a single branch of a general communication system incorporating the present invention is shown at 300. A message signal to be simulcast over the system originates at message center 102, not shown, through central controller 104', across interconnect link 106 having an associated time delay $t_1$ to base station equipment 108' having a transmitting antenna 110. Central controller 104' has been modified to include a resynchronization (re-sync) mode and has some additional circuitry for receiving a reference sync signal from an included master timing signal receiver 305.

At the opposite end of interconnect link 106, the base station equipment 108' has been modified over that in FIG. 1 along its transmitter path to include an adaptive delay device 301 which will be discussed shortly. The base station transmitter 303 is a suitable transmitter normally a part of base station equipment 108 or 108'. The adaptive delay device 301 has two modes of operation. During normal operation, it exhibits a fixed amount of time delay for signals passing from the interconnect link to the base station transmitter. During its second mode, hereinafter referred to as the re-sync mode, which becomes active upon receiving a resynchronization command from the central controller 104', the adaptive delay device re-adjusts its amount of delay $t_v$ upon receiving a reference sync signal from a master timing signal receiver 305 included in close proximity to base station equipment 108' and suitably connected as shown. The typical values for $t_v$ range from near zero to 250 microseconds for accommodating links up to 10 miles in length, and are varied in opposite fashion to the value of delay in the interconnect link. Also connected to master timing signal receiver 305 is its own dedicated receiving antenna 306.

Master timing signal (M.T.S.) receiver 305 consists of a suitable radio navigation receiver 307 and a suitable fixed delay network 308 for providing a reference sync signal. Such a radio navigation receiver is capable of receiving one or more master timing sources, such as WWV, Loran-C, Transit Satellite, Global Position Satellites, or GOES Satellites. The most important characteristic of the master timing signal receiver 305 is that it exhibits a fixed and accurate time delay from the moment it receives a master timing signal source via antenna 306 to the time it outputs a reference sync signal at its output at 309. This value of fixed time delay is chosen to be the maximum of $t_1$, $t_2$. . . $t_N$ (or $T_{MAX}$), whatever value this happens to be.

The simulcast system operation is regulated by central controller 104', which has a normal mode and a resync mode of operation. The normal mode consists of central controller 104' routing a message signal to be simultaneously broadcast by all of the base station transmitters in the system via an interconnect link 106 having an associated time delay which is added to an amount of delay in adaptive delay device 301 to achieve a uniform system-wide time delay for each branch of the simulcast system. If, however, the interconnect link such as link 106 is disturbed to inclement weather, interference, or other equipment difficulties, an alternate interconnection link having a different corresponding time delay, say $t_1'$ may be established. This alternate link may be established regardless of whether the interconnect link is an RF link or a phone-line link. When this alternate link substitution occurs, any message signals to be simulcast throughout the system will be delayed along this interconnect link by a different amount of time delay which is not in step with the other branches of the simulcast system. Moreover, the establishment of one or more of these alternate interconnect links may occur without the central controller 104' able to know or predict it. Therefore, in operation the central controller 104' reverts to a resync mode which occurs a predetermined number of times throughout a day, for example every hour, to accurately adjust the adaptive delay device included as a part of the base station equipment at the far end of each interconnect link. By so doing, the central controller may then proceed with normal operations and be reasonably confident that the system is operating with a uniform amount of time delay for each branch in the system, thus guaranteeing that time-synchronized simulcast message signals will be received at each of the one or more portable radios located throughout the system geographical area.

Figure 4:
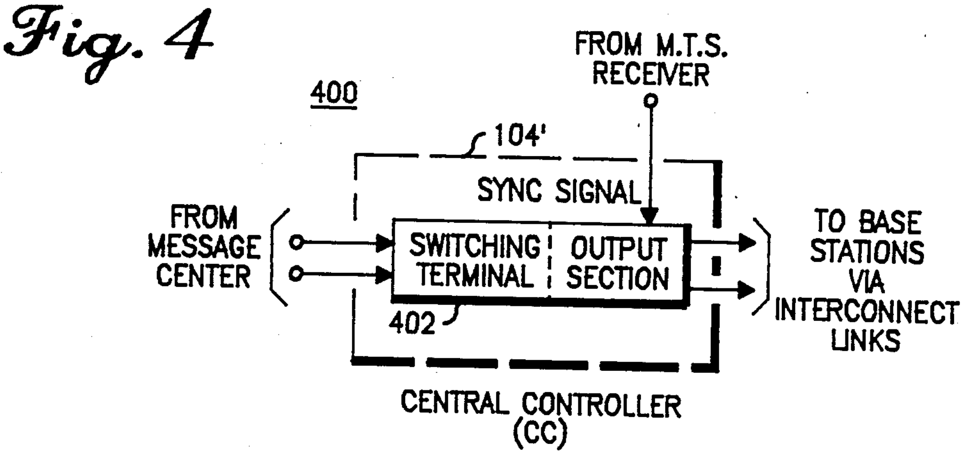
FIG. 4 is a diagram of the central controller showing that the sync signal enters the output section.

Referring to FIG. 4, the major functional blocks which constitute the central controller 104' are shown at 400. Such a controller typically consists of a switching terminal 40 having a suitable message signal control output section. It includes the usual connections from a message center and connections to the various interconnect links. This terminal utilizes a reference sync signal provided by a master timing signal receiver connection port, as shown.

Figure 5A:
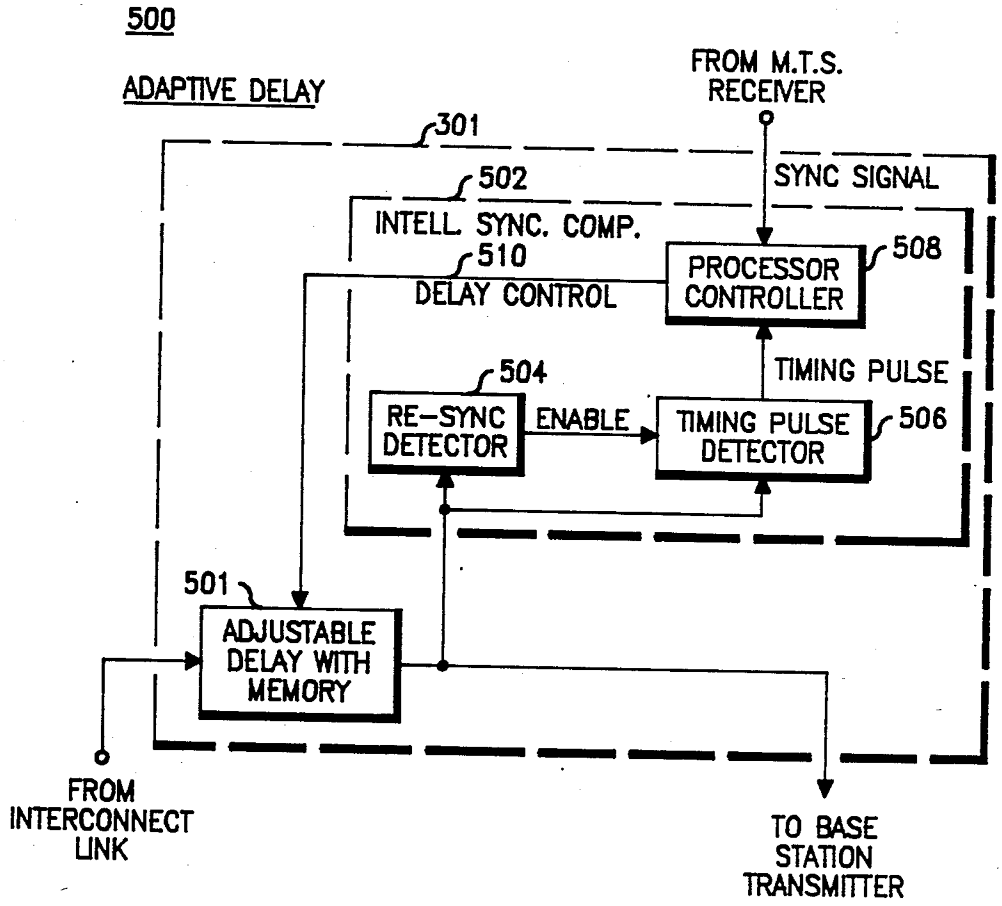
FIG. 5*a* is a diagram of the functional blocks utilized in the adaptive delay device within the base station equipment.

Referring to FIG. 5*a*, the functional blocks comprising the adaptive delay device 301 are shown at 500. Obtaining the message signal from the terminal via an interconnect link, an adjustable delay network 501 which is electrically controlled by an intelligent sync comparator 502 containing a re-sync detector 504, timing pulse detector 506, and processor-controller 508, is used to control the delay via delay control 510 to provide an additional amount of time delay before modulating the base station transmitter.

Figure 5B:
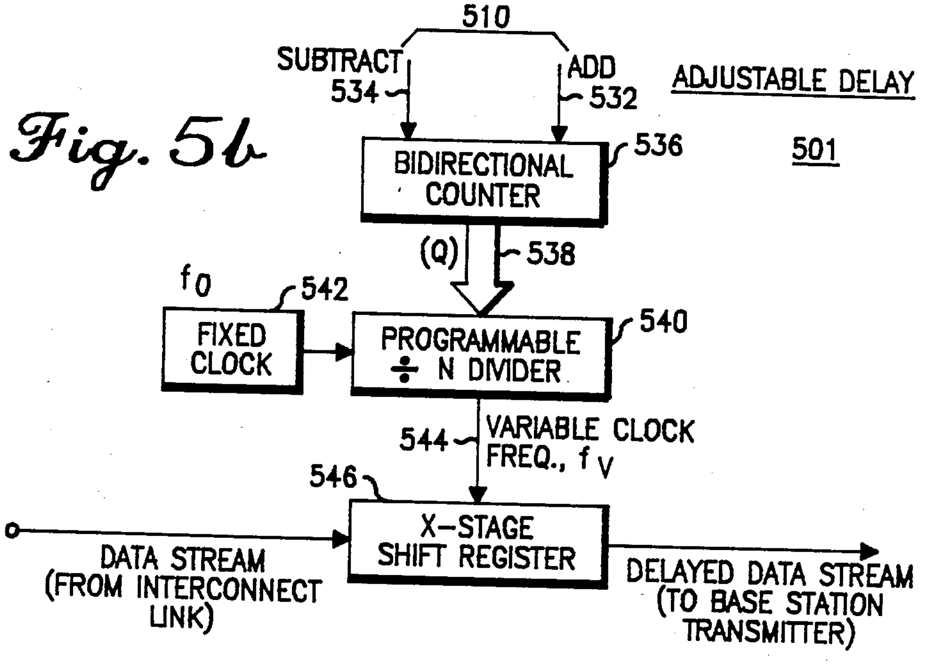
FIG. 5*b* is a diagram of the functional blocks utilized in the adjustable delay within the adaptive delay device.

Referring to FIG. 5*b*, the functional blocks comprising the adjustable delay 501 are shown. This adjustable delay consists of bidirectional counter 536, programmable N divider 540, fixed clock 542 having a constant output frequency, and an X-stage shift register 546. The data stream being inputted to the adjustable delay 501 from the interconnect link is delay compensated in the X-stage shift register 546 to produce a delayed data stream output. The propogation delay generated by the X-stage shift register 546 is controlled by a variable clock frequency $F_v$, which is input at terminal 544. The elements shown above this point 544 include bidirectional counter 536 programmable N divider 540 and fixed clock 542 and implement an arrangement which provides the variable clock frequency $f_v$ needed at 544.

In operation, the intelligent sync comparator 502 outputs delay control 510 which caused the bidirectional counter 536 to increment (add) or decrement (subtract) on the sync comparison signal via lines 532 and 534 respectively. The resulting count value Q at 538 controls the programmable N divider 540 which modifies the fixed frequency of fixed clock 542 to provide variable clock frequency $F_v$ at 544. This variable clock frequency $f_v$ at 544 supplied to X-stage shift register 546 causes a delay of ($F_v$/X) to the data stream before it is applied to the modulator of the base station transmitter. The variable clock frequency $F_v$ is determined according to the following relationship:

$F_v = F_O/Q$, where Q is the bidirectional counter output, $F_0$ is the frequency of the fixed clock 542, and the range of the delay varies from: $F_0$/ X, for Q=1, to $F_0$/ NX, for Q=N.

Thus the adjustable delay 501 is able to increase, decrease, or maintain its current value of propogation delay as deemed necessary by the intelligent sync comparator. Those of ordinary skill in the art will appreciate that the adjustable delay 501 of the present invention can be constructed using well-known components. W. For example, the bidirectional counter may be an MC145168, the fixed clock may be an MC7404, the programmable N divider may be a MC145168, and the X-stage shift register may be a number of shift registers MC14015 coupled serially.

Figure 6:
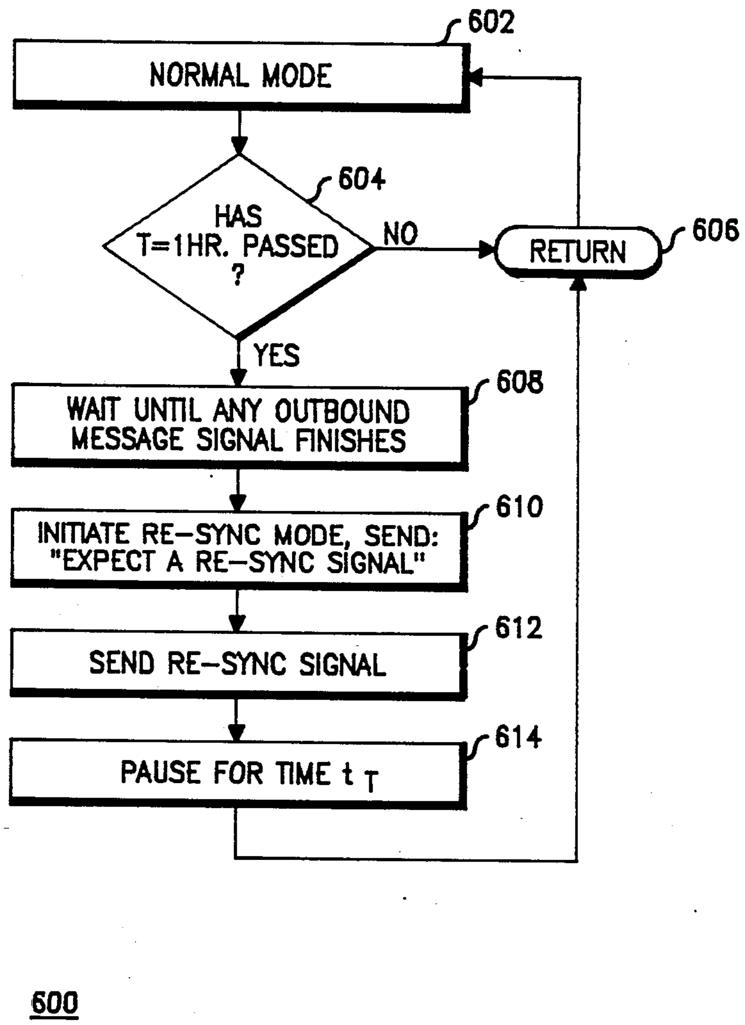
FIG. 6, is a flowchart used by the central controller in FIG. 4.

Referring to FIG. 6, a flow diagram is shown at 600 for the central controller when it suspends normal operations and performs system resynchronization during the resync mode. The central controller operates predominantly in the normal mode designated by block 602. However, the central controller includes an elapsed time device, not shown, which provides periodic resynchronization of the simulcast transmission system. This elapsed time device will reach its prescribed time, in this example one hour, as designated by block 604. A return block 606 is provided in case the prescribed time has not been exceeded. Assuming the prescribed time has been exceeded, the central controller proceeds along YES path to block 608 which checks to see if any outbound message signals are currently in progress. The central controller pauses here while it waits for a message signal to finish. Then, proceeding to block 610 the central controller initiates the re-sync mode coinciding with the sync signal. It then sends a code, "Expect a re-sync signal". Proceeding to block 612, the central controller then sends the re-sync signal. The central controller then pauses at block 614 for a prescribed time $t_T$, where $t_T > t_{MAX} + t_v$, to insure that all of the base station equipment has time to receive the appropriate signals and complete their corresponding adjustments. The central controller then returns by way of block 606 back to the normal mode indicated by block 602. The duration of the re-sync mode typically would occur in approximately 1 millisecond, due to the pulse spacing in a Loran-C signal, with the majority of the time duration being a function of time $t_T$. Upon completing the resync mode in relatively short time, the central controller then returns to normal operation.

Figure 7B:
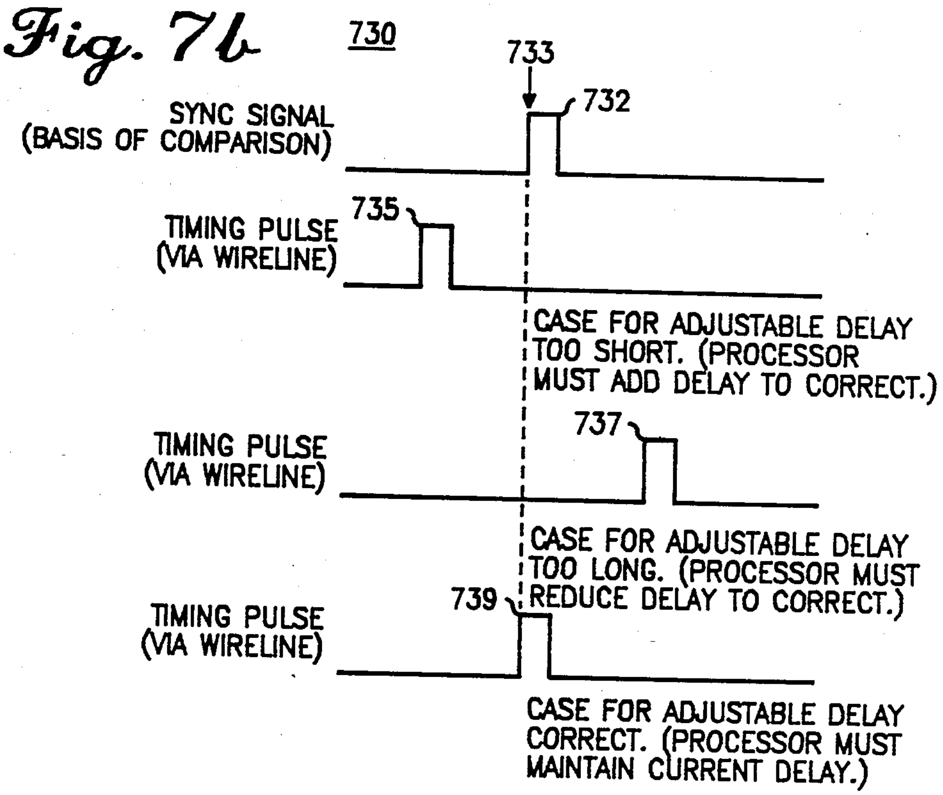
FIG. 7*b* is a timing diagram illustrating the various possible occurrences of the timing pulse with respect to the sync signal as compared in FIG. 7*a*.
Figure 7A:
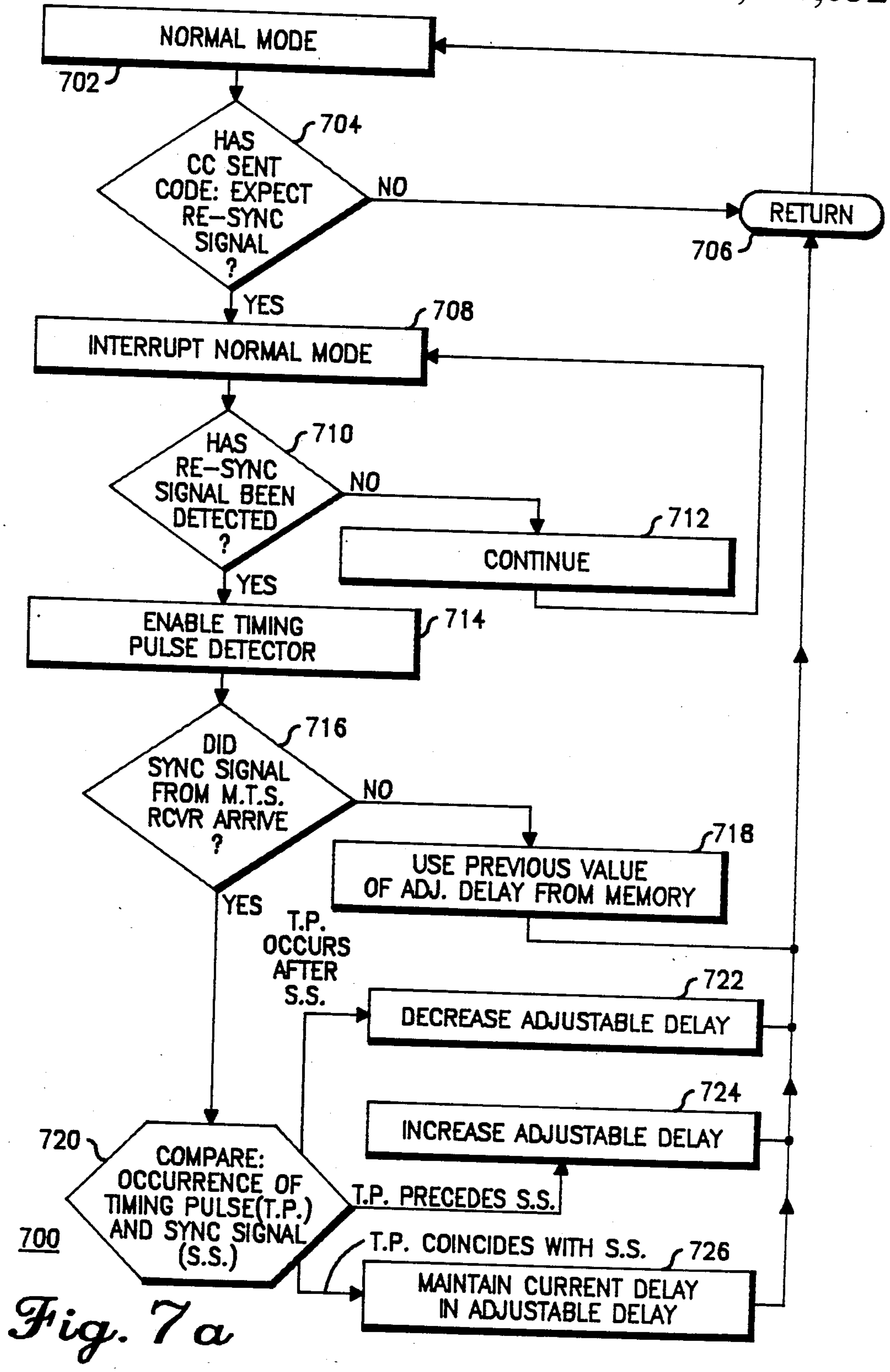
FIG. 7*a* is a flowchart used by the base station equipment in FIG. 5*a* and FIG 5*b*.

Referring to FIG. 7*a*, a flow diagram is shown at 700 indicating how the adaptive delay device responds to normal message signals from the interconnect link and to a resync command originating from the central controller. Beginning with block 702 designated normal mode, the adaptive delay device included at each base station operates so that a large percentage of its time is spent in this normal mode. However, as block 704 indicates, the adaptive delay device continuously checks to see whether the central controller has sent the code, "Expect a re-sync signal". If the central controller has not sent the code, NO path from block 704 proceeds to return, via block 706, back to the normal mode. If the adaptive delay device has determined that the central controller has sent the above-mentioned code, then it proceeds along the YES path to block 708 which interrupts the normal mode of the base station. Continuing along to block 710, the adaptive delay device then checks to see whether the actual re-sync signal has been detected. If it has not, it proceeds along NO path to block 712 and maintains the interrupted condition indicated by block 708. Upon detecting the re-sync signal at block 710, the adaptive delay device follows YES path to block 714 which enables a timing pulse detector. It then proceeds to check, via block 716, whether a sync signal from the master timing signal receiver did arrive. If a sync signal did not arrive, the adaptive delay device follows NO path to block 718 and uses the previous value of adjustable delay from memory to restore operation, since there has been no change. The adaptive delay device then proceeds via return block 706 back to the normal mode. Such an error condition may occur if the master timing signal is not received by the master timing signal receiver. Assuming that a sync signal did arrive, the adaptive delay device would follow YES path from block 716 to block 720. Here, a comparison is made between the occurrences of the timing pulse signal and the sync signal to determine if the timing pulse occurs after the sync signal, if the timing pulse precedes the sync signal, or the timing pulse coincides with the sync signal. If the timing pulse occurs after the sync signal, the intelligent sync comparator causes a decrease in the adjustable delay at block 722 by means of delay control 510 depicted in FIG. 5*a* and FIG. 5*b*. It then returns, via block 706, back to the normal mode. On the other hand, if the timing pulse precedes the sync signal, the intelligent sync comparator causes an increase in the adjustable delay at block 724 via the delay control 510 of FIG. 5*a* and FIG. 5*b*. It then returns, via block 706, back to the normal mode. If the timing pulse coincides with the sync signal, the intelligent sync comparator causes the adjustable delay to maintain its current value of delay by utilizing the previous value stored in bidirectional counter 536, and is summarized at block 726 in FIG. 7*a*. It then returns, via block 706, back to the normal mode 702. Utilizing the reference sync signal to quickly adjust its delay, the adaptive delay device maintains the proper amount of total delay to insure that, during simulcast, a given branch of the communication system is in step with each and every other branch within the system.

In FIG. 7*b*, there is shown at 730 a timing diagram of the present invention to better illustrate the relationship between the sync signal 732 with its corresponding critical edge 733, to the various possible occurrences of the timing pulse when it precedes the sync signal as shown at 735, when it follows the sync signal 732 as shown at 737, or when the timing pulse coincides with the sync signal as shown at 739. This timing diagram 730 illustrates, therefore, the comparison taking place in block 720 of FIG. 7*a*.

Figure 8:
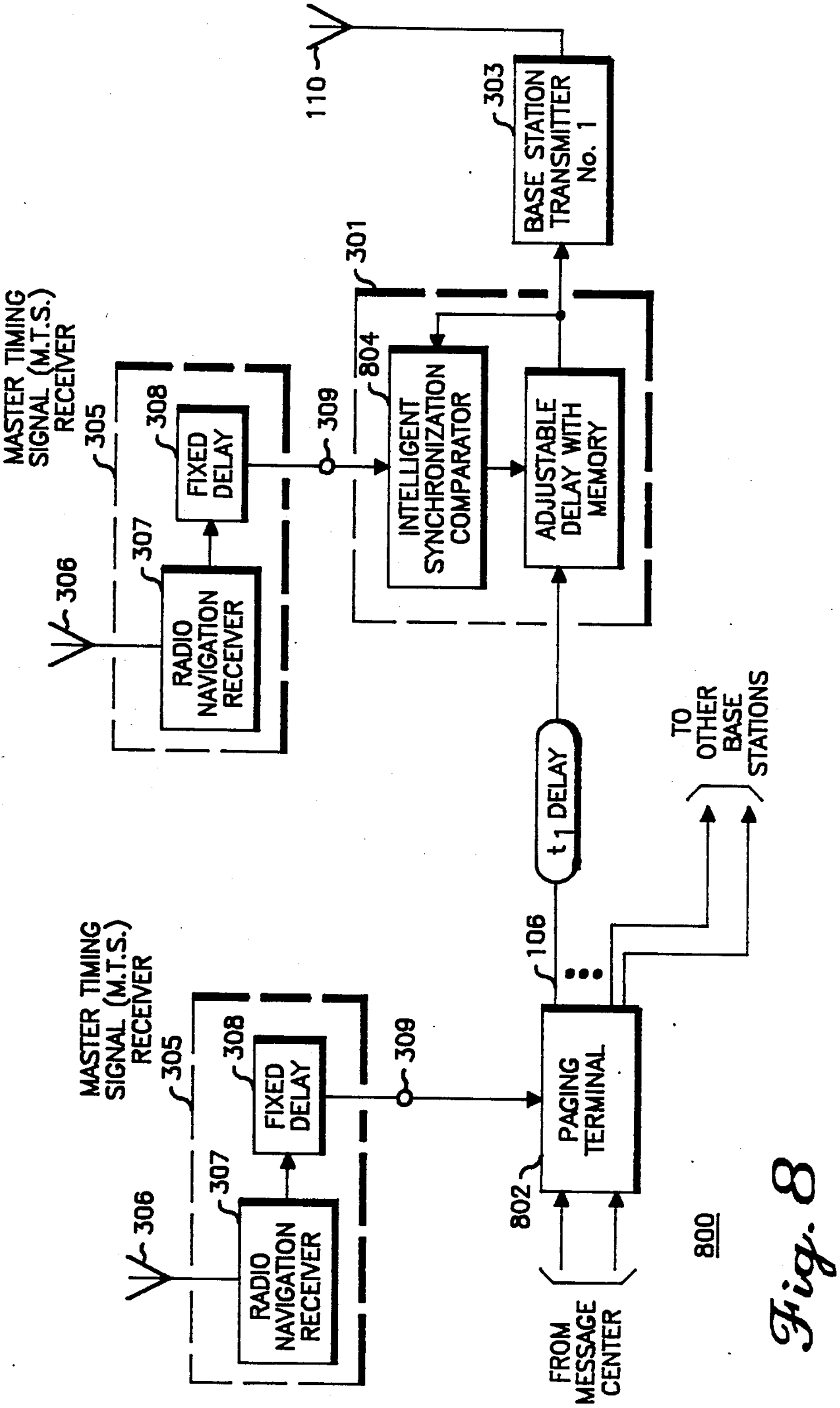
FIG. 8 is a block diagram of an alternate embodiment of the present invention showing one branch of a paging simulcast system.

Finally, in FIG. 8 there is shown at 800 an alternate embodiment of the present invention in which the communication system has only a simulcast mode as the normal mode of operation. In this particular system, such as a paging system, message signals only originate from the message source and are routed by the paging terminal 802, such as a Motorola Metro Page 200, Model #E09DAC 0200, to each branch of the paging system for simultaneous broadcast by transmitters such as Motorola Simulcast Perc Stations, Model #C73JZB1101, throughout its geographical area of coverage.

In summary, each of the above-mentioned systems 300 and 800 is able to accomplish the automatic synchronization of simulcast transmission systems while maintaining a uniform system-wide time delay by utilizing a precision timing source such as WWV, Loran-C, or other radio navigation satellite signals. Thus, each of these systems is able to remotely adjust the total time delay to each base site transmitter so that each interconnect link is effectively compensated in closed-loop fashion, thereby automatically providing a uniform, time-synchronized signal while minimizing maintenance expense and disruption.

Although the simulcast transmitter apparatus having automatic synchronization capability of the present invention fully discloses many of the attendant advantages, it is understood that various changes and modifications not depicted herein are apparent to those skilled in the art. Therefore, even though the form of the above-described invention is merely a preferred or exemplary embodiment, further variations may be made in the form, construction, and arrangement of the parts within the system without departing from the scope of the above invention.

I claim:

1. In a plurality of base stations, each having a transmitter connected to a central controller via an interconnect link having an associated time delay and forming one branch of a simulcast transmission system for transmitting message signals in a synchronized first mode, apparatus for providing automatic synchronization capability, the apparatus comprising in combination:

adaptive delay means, inserted between said interconnect link and said transmitter, having a first input electrically connected to said interconnect link and a second input for utilizing a reference sync signal; and master timing signal receiving means electrically connected to said second input of said adaptive delay means for providing said reference sync signal thereto, said adaptive delay means having a first and a second mode of operation, with said second mode activated upon detecting a re-sync command from said central controller at said first input and utilizing said reference sync signal at said second input for varying an adjustable time delay therein in opposite fashion to said associated delay, for re-adjusting, during said second mode and automatically maintaining during said first mode, a constant total delay from said central controller to each of said transmitters, for sending message signals from said base stations in precise time synchronization.

2. The automatic synchronization apparatus according to claim 1, wherein said adaptive delay means comprises an adjustable delay and an intelligent syn comparator.

3. The automatic synchronization apparatus according to claim 2, wherein said intellligent sync comparator comprises a re-sync detector, a timing pulse detector, and a processor-controller for controlling said adjustable delay.

4. The automatic synchronization apparatus according to claim 2, wheien said adjustable delay comprises:

a bidirectional counter having add and substract inputs;

a variable frequency clock formed by a fixed clock and a programmable divider controlled by said counter; and a plurality of shift registers operatively controlled by said variable frequency clock to effect a delay in said message signal.

5. The automatic synchronization apparatus according to claim 1, wherein said master timing signal receiving means includes suitable radio navigation receiving means and a fixed delay network for providing said reference sync signal.

6. The automatic synchronization apparatus according to claim 5, wherein said radio navigation receiving means comprises a radio navigation receiver electronically tunable to at least one of a plurality of radio navigation signals such as a Loran-C master timing signal.

7. A method for use in a plurality of base stations, each having a transmitter connected to a central controller via an interrconnect link having an associated time delay and forming one branch of a general communication system which has a normal, synchronized first mode for transmitting message signals, the method briefly interrupting the normal mode in order to automatically re-synchronize all transmitters, the method comprising the steps of:

receiving, at each transmitter, a reference sync signal;

receiving from said central controller, a re-sync command coinciding with said reference sync signal, for switching from said first mode to a second mode;

comparing, during said second mode, the time occurrence of said re-sync command and said sync signal; and adjusting an amount of time delay, based upon a time difference measured between said re-sync command and said sync signal, utilizing adaptive delay means included in each transmitter, so as to automatically maintain, during said first mode, a constant total delay to each of said transmitters which is equal to each and every branch time delay.

8. The method according to claim 7, wherein the step of receiving a reference sync signal includes the steps of receiving a master timing signal such as a radio navigation signal and providing a fixed time delay in order to convert said master timing signal into a suitable reference sync signal.

9. The method according to claim 7, wherein the step of comparing, during said second mode, the time occurrence of said re-sync command and said sync signal includes the steps of computing a time difference between said re-sync command and said reference sync signal in a processor-controller and outputting a delay control signal.

10. The method according to claim 7, wherein said step of adjusting an amount of time delay includes the steps of:

accepting a delay control signal from an included processor-controller to modify a previous value of time delay maintained by an included bidirectional counter which controls a variable frequency clock; and utilizing asid variable frequency clock related to the delay control signal to effect the proper amount of time delay presently needed.

11. The method according to claim 7, wherein the step of receiving a re-sync command includes the step of activating a re-sync detector, which in turn initiates a re-synchronization mode at said transmitter by enabling a timing pulse detector.

* * * * *

UNITED STATES PATENT AND TRADEMARK OFFICE
CERTIFICATE OF CORRECTION

PATENT NO. : 4,696,052

DATED : September 22, 1987

INVENTOR(S) : Robert L. Breeden

It is certified that error appears in the above-identified patent and that said Letters Patent is hereby corrected as shown below:

In claim 2, line 32, change "syn" to be --sync--.

In claim 4, line 40, change "wheien" to be --wherein--.

Signed and Sealed this

Thirteenth Day of December, 1988

*Attest:*

DONALD J. QUIGG

*Attesting Officer*

*Commissioner of Patents and Trademarks*